United States Patent [19]

Lenart et al.

[11] 4,384,788
[45] May 24, 1983

[54] SELF-SUPPORTING STIRRER FOR MIXING A BED OF FREE-FLOWING SOLIDS

[75] Inventors: Wolfgang Lenart, Ludwigshafen; Wolfgang Rau, Heidelberg-Rohrbach; Hubertus Baron, Ludwigshafen, all of Fed. Rep. of Germany

[73] Assignee: BASF Aktiengesellschaft, Ludwigshafen, Fed. Rep. of Germany

[21] Appl. No.: 204,538

[22] Filed: Nov. 6, 1980

[30] Foreign Application Priority Data

Nov. 12, 1979 [DE] Fed. Rep. of Germany ....... 2945678

[51] Int. Cl.³ .......................... B01F 7/16; B01F 15/00
[52] U.S. Cl. .................................... 366/314; 366/331; 366/349
[58] Field of Search ............... 366/102, 199, 201, 205, 366/206, 207, 279, 281, 282, 283, 284, 286, 314, 331; 277/93 R, 1, 9, 109, 111, 116.4; 99/287, 348; 308/139, 72; 241/282.2

[56] References Cited

U.S. PATENT DOCUMENTS

| | | | |
|---|---|---|---|
| 1,237,222 | 8/1917 | Schröder | 366/286 |
| 2,218,034 | 10/1940 | Bartosch | 308/139 |
| 2,622,943 | 12/1952 | Wankat et al. | 308/72 |
| 3,421,742 | 1/1969 | Swanke et al. | 241/282.2 |
| 3,572,650 | 3/1971 | Kupka | 366/286 X |

FOREIGN PATENT DOCUMENTS

| | | | |
|---|---|---|---|
| 10637 | 10/1956 | Fed. Rep. of Germany | 366/205 |
| 1218265 | 6/1966 | Fed. Rep. of Germany | . |
| 1557042 | 1/1971 | Fed. Rep. of Germany | . |

*Primary Examiner*—Philip R. Coe
*Assistant Examiner*—Joseph M. Pitko
*Attorney, Agent, or Firm*—Keil & Witherspoon

[57] ABSTRACT

In a self-supporting stirrer for mixing a bed of free-flowing solids, the lower end of the stirring device, facing the bottom of the stirred vessel, passes into a hub. The hub is located on a vertical drive shaft which extends through the bottom of the stirred vessel and consists of shaft sections detachably joined to one another. The drive shaft itself is carried in a cage attached to the bottom of the stirred vessel and can be adjusted vertically by means of a lifting device. This opens or closes an annular gap between a centering cone, provided at the bottom of the stirred vessel, and a conically recessed ring, inserted in the hub. In this way, the need to empty the vessel, for example when carrying out maintenance or repair work, is avoided.

3 Claims, 1 Drawing Figure

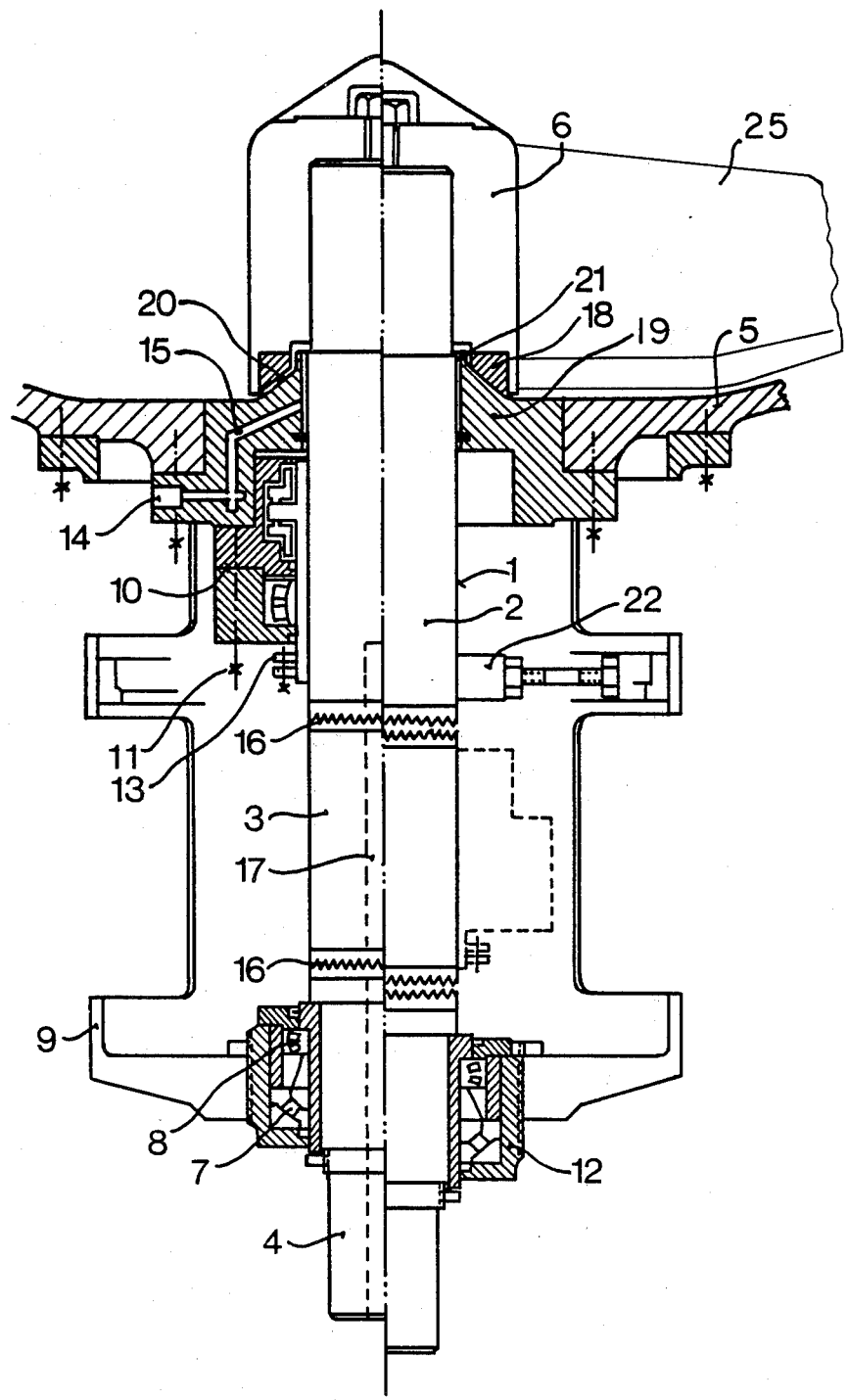

SELF-SUPPORTING STIRRER FOR MIXING A BED OF FREE-FLOWING SOLIDS

The present invention relates to a self-supporting stirrer, for mixing a bed of free-flowing solids, possessing a stirring device whose lower end, facing the bottom of the stirred vessel, passes into a hub which in turn seats on a vertical drive shaft which passes through the bottom of the stirred vessel.

The use of motor-driven self-supporting stirrers for generating a mixing motion of pulverulent or finely granular materials has been disclosed. Depending on the particular conditions, the stirrers may have various shapes, the actual stirring member being, for example, in the shape of a beam, finger, spiral or anchor. The mixing action of these devices as a rule depends on the construction of the stirrer, the stirrer speed and the nature of the material to be mixed. Stirring and mixing of powder beds consisting of materials obtained by gas-phae polymerization, such as polyethylene or polypropylene, is particularly difficult. With these materials, the mixing motion is frequently hampered by the tendency of the pulverulent or finely granular reaction products to melt or sinter. Furthermore, if the drive shafts of the stirring device are long, bending vibrations, which, inter alia, have an adverse effect on the shaft seals, prove particularly troublesome.

It is true that German Pat. Nos. 1,218,265 and 1,557,042 have disclosed self-supporting stirrers, with short vertical drive shafts passing through the bottom of the stirred vessel, which are free from the above disadvantages and permit the polymerization to take place trouble-free in relatively small reactors. However, when such stirrers are applied to larger polymerization reactors, for example exceeding a capacity of 10 m$^3$, it has been found that they are no longer satisfactory in every respect. In particular, the higher stirrer power resulting from the larger size of the unit, the larger diameter of the stirring devices and the higher reaction pressures necessitate the use of additional devices, for example rotary mechanical seals, for sealing the drive shaft. However, the use and manipulation of a rotary mechanical seal of this magnitude requires substantial expense and extreme care, both in operating the stirred vessel and in assembly work. For example, when assembling or dismantling the rotary mechanical seal, the drive shaft, bearing the stirring device, must either be fixed firmly with the axle absolutely true, or must be suspended so as to be radially slightly movable. Hitherto, such preconditions for assembly work only existed if the stirred vessel had been opened, emptied and cleaned.

It is an object of the present invention to provide a self-supporting stirrer for mixing a bed of free-flowing solids, which does not suffer from these disadvantages and permits substantially uniform mixing of the entire contents of the vessel. It is a further object of the invention to provide a stirrer which is easy to maintain and which, in particular, does not necessitate emptying the vessel in order to carry out such maintenance.

We have found that this object is achieved, according to the invention, if the drive shaft is carried in a cage, fixed to the bottom of the stirred vessel, and is vertically adjustable by means of a lifting device, and the hub, connected to the drive shaft, possesses a conically recessed ring which matches a centering cone on the bottom of the stirred vessel.

According to the invention, an annular gap is formed between the conically recessed ring and the centering cone, through which, for example, ethylene or propylene is fed to the reactor, along the stirring device, for polymerization and for removal of heat, and is uniformly distributed over the bed of solids, thereby substantially eliminating any concentration differences and avoiding local overheating. By lowering the stirrer together with the drive shaft onto the centering cone on the bottom of the stirred vessel, the annular gap is sealed and the stirrer remains in its axial position. Emptying the vessel contents to carry out subsequent maintenance work is not necessary. Accordingly, substantial savings in time and expense can be achieved.

As a result of the stepless adjustability of the drive shaft and hence of the entire stirrer, the size of the annular gap can be varied in order to achieve the best setting for keeping the sealing faces free from solids, for example from polymer. Furthermore, the flow rate of the medium to be introduced can be kept constant for different reactor throughputs, so that the medium entering through the gap does not affect the mixing action in the reactor; alternatively, the flow rate of the medium to be introduced can be altered so as to change the mixing action in the vicinity of the reactor bottom, and to change the distribution of the media. Finally, if the stirring device is appropriately designed, for example in the form of a spiral, the lifting device also makes it possible to vary the distance between the stirring device and the bottom of the vessel.

According to a further feature of the invention, the drive shaft consists of shaft sections detachably joined to one another. Some of these sections can be removed after lowering the stirrer, as a result of which repair work, in particular the replacement of the rotary mechanical seal units, is more easily carried out.

An example of the novel stirrer is discussed below with reference to the drawing, which shows two conditions of the stirrer in a single picture.

The stirrer consists of a stirring device, schematically indicated in the drawing by the reference numeral 25, located along the central axis of the vessel, for example a spiral or an anchor, the lower end of which, facing the bottom 5 of the stirred vessel, is attached to a hub 6. This hub is connected to a vertical drive shaft 1 which passes through the bottom of the stirred vessel. The three sections of the drive shaft are marked 2, 3 and 4 and are clamped together, for example by means of tension rods 17 and frontal toothing 16, to resist flexing and twisting. The drive shaft itself is mounted in the cage 9 attached to the bottom of the stirred vessel, the lower radial bearing 7 and axial bearing 8 being set in a device for raising and lowering, which in the embodiment shown is a threaded bush 12. The rotary mechanical seal and the upper radial bearing form a single constructional unit 10 and are attached to the bottom of the vessel by bolts 11 and secured by means of a clamping arrangement 13.

The stirrer, together with the drive shaft 1, can be raised (to bring it to the operating position) or lowered (to bring it to the position for maintenance), by means of the threaded bush 12 which rests against the cage 9. This either releases or seals an annular gap 20 between the centering cone 19 provided on the bottom 5 of the stirred vessel and the conically recessed ring 18 inserted in the hub 6. Gas—namely monomer or inert gas—can be fed into the stirred vessel through channels 14 and 15 in the bottom of the vessel and thence through the annular gap 20.

Repair or maintenance work on the self-supporting stirrer described above, for example the replacement of the rotary mechanical seal, can be carried out as follows:

After stopping the stirrer and releasing the pressure in the vessel, nitrogen for flushing the annular gap 20 is led in through channels 14 and 15. The clamping device 13 is released and the stirrer together with the drive shaft is lowered, by means of the threaded bush 12, until the conically recessed ring 18 rests on the centering cone 19, which may be additionally provided with an overflow 12. This seals the bottom of the vessel and centers the stirrer together with the drive shaft. After undoing the bolts 11, the rotary mechanical seal/bearing unit is lowered as far as the center of the middle section 3 of the shaft and is there fixed by means of the clamping device 13. A split assembling ring 22 is attached, after which the tension rod 17 is undone and removed. By further lowering the shaft sections 3 and 4 by means of the threaded bush 12, the shaft section 3 carrying the rotary mechanical seal/bearing unit 10 is released and can be taken sideways out of the cage 9. The fitting of a previously prepared shaft section 3 carrying a rotary mechanical seal/bearing unit 10 can be commenced immediately and the stirrer can be put back into operation within a relatively short time.

We claim:

1. A self-supporting stirrer for mixing a bed of free-flowing solids, having a stirring device whose lower end, facing the bottom of the stirred vessel, passes into a hub which in turn seats on a vertical drive shaft which passes through the bottom of the stirred vessel, wherein there are attached to the bottom of the stirred vessel a cage carrying the drive shaft, near its lower end, through the medium of a vertical adjusting device, and sealing-and-bearing means near the upper end of said shaft for sealing and centering said shaft during the operation of the stirrer, and wherein said hub has at its bottom a recessed ring with a downwardly flaring female cone and the bottom of the stirred vessel has a correspondingly flaring male cone, said female cone engaging said male cone upon lowering of said vertical adjustment means, such as to keep said vessel sealed and said shaft centered when said sealing-and-bearing means, in a maintenance operation, is downwardly removed from the unemptied vessel and freed from said shaft.

2. A self-supporting stirrer as claimed in claim 1, wherein said vertical adjusting means comprises a threaded bushing providing a continuous adjustment for the vertical position of said shaft.

3. A self-supporting stirrer as claimed in claim 1 or 2 wherein said shaft has three sections, a top section, a center section and a bottom section, which are detachably joined to each other in axially aligned relationship and wherein there are provided means for axially moving said sealing-and-bearing means from the top section to the center section of said shaft, said center section together with said sealing-and-bearing means being removable to the outside of said cage upon a lowering of said vertical adjusting means sufficient to free said center section from the other two sections of said shaft.

* * * * *